US012335695B2

(12) United States Patent
Shindo

(10) Patent No.: US 12,335,695 B2
(45) Date of Patent: Jun. 17, 2025

(54) IMAGING APPARATUS AND METHOD FOR CONTROLLING THE SAME

(71) Applicant: CANON KABUSHIKI KAISHA, Tokyo (JP)

(72) Inventor: Yoshinori Shindo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 18/057,106

(22) Filed: Nov. 18, 2022

(65) Prior Publication Data

US 2023/0164485 A1 May 25, 2023

(30) Foreign Application Priority Data

Nov. 25, 2021 (JP) ................................ 2021-191538

(51) Int. Cl.
*H04R 3/00* (2006.01)

(52) U.S. Cl.
CPC .................................... *H04R 3/002* (2013.01)

(58) Field of Classification Search
CPC .... H04R 3/002; H04R 3/005; H04R 2410/05; H04R 2499/11
USPC ........................................................ 381/71.1
See application file for complete search history.

(56) References Cited

U.S. PATENT DOCUMENTS 5,243,661 A * 9/1993 Ohkubo et al.
10,909,961 B2 * 2/2021 Hansson

FOREIGN PATENT DOCUMENTS

JP H06253387 A 9/1994

* cited by examiner

*Primary Examiner* — Vivian C Chin
*Assistant Examiner* — Jessica W. Tai
(74) *Attorney, Agent, or Firm* — Canon U.S.A., Inc. IP Division

(57) ABSTRACT

An imaging apparatus includes an external-audio microphone that collects an external sound that occurs outside the imaging apparatus, a noise reference microphone that obtains drive noise of the imaging apparatus or an external apparatus connected to the imaging apparatus, a detection unit that detects a noise period during which the drive noise occurs, an updating unit that updates background noise based on an audio signal obtained by the noise reference microphone during a no-noise period determined by the detection unit as a period in which no noise occurs, a generation unit that generates an audio signal of the drive noise from the audio signal obtained by the noise reference microphone and the updated background noise, and a noise reduction unit that reduces the audio signal of the drive noise generated by the generation unit from the audio signal obtained by the external-audio microphone during the noise period.

8 Claims, 6 Drawing Sheets

IMAGING APPARATUS AND METHOD FOR CONTROLLING THE SAME

BACKGROUND

Field of the Disclosure

The present disclosure relates to an imaging apparatus capable of reducing noise included in an audio signal.

Description of the Related Art

It is known to perform a noise reduction process such that noise caused by driving a lens is reduced using a noise reference microphone installed inside a camera housing. Japanese Patent Laid-Open No. 6-253387 discloses inputting an output of a noise reference microphone to an FIR filter and subtracting the output of the FIR filter from an output of a main microphone. Japanese Patent Laid-Open No. 6-253387 also discloses estimating the impulse response of a transmission system from the noise reference microphone to the main microphone and correcting the tap coefficients of the FIR filter based on the estimated impulse response.

However, there is a possibility that, in addition to the noise caused by the driving of the lens, noise generated by other noise sources, for example, self noise such as electric noise of a microphone, a leakage of an external sound, etc., may intrude into the noise reference microphone. This may cause a possibility that a noise component generated by the noise reference microphone is excessively subtracted from the audio signal input from the main microphone, or a possibility that the noise reduction is not performed properly.

SUMMARY

According to an aspect of the embodiments, it is possible to suppress the influence of temporary noise on noise reduction processing.

According to an aspect of the embodiments, there is provided an imaging apparatus including a first microphone that obtains an audio signal of a sound that occurs outside the imaging apparatus, a second microphone that obtains an audio signal of a sound including drive noise that is noise from a drive unit, and a processor that executes instructions stored in a memory and functions as each of following units, a detection unit that detects a noise period during which the drive noise occur, an obtaining unit that obtains background noise based on an audio signal obtained by the second microphone during a period other than the noise period detected by the detection unit, a generation unit that generates an audio signal of the drive noise based on an audio signal obtained by the second microphone during the noise period detected by the detection unit and the background noise obtained by the obtaining unit, and a noise reduction unit that reduces, using the audio signal of the drive noise generated by the generation unit, the drive noise from the audio signal obtained by the first microphone during the noise period detected by the detection unit.

Further features of the present disclosure will become apparent from the following description of exemplary embodiments with reference to the attached drawings.

DESCRIPTION OF THE EMBODIMENTS

Figure 1:
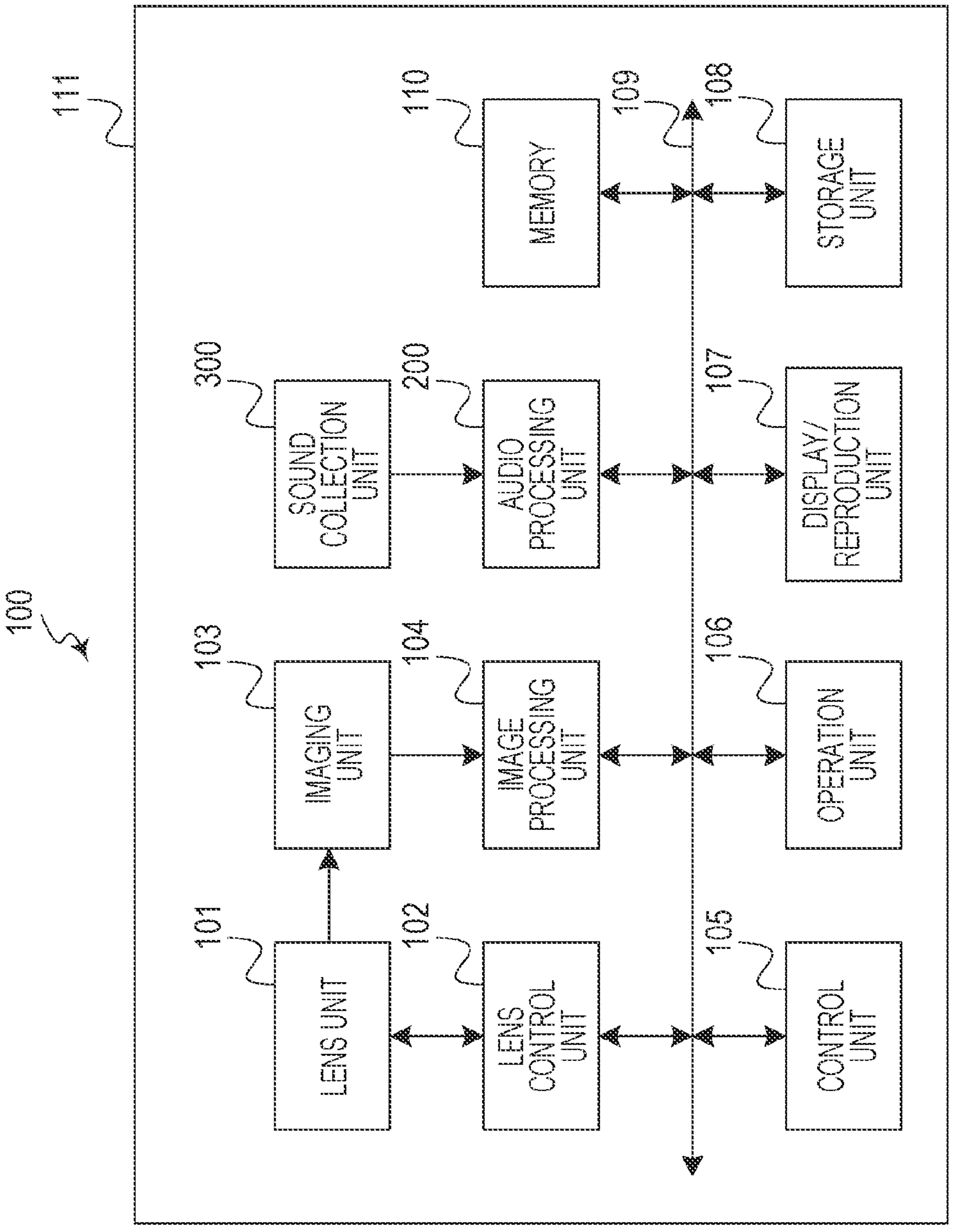
FIG. 1 is a block diagram of an imaging apparatus according to one or more aspects of the present disclosure.

Embodiments of the present disclosure are described below with reference to the drawings. Note that these embodiments are described by way of example and these embodiments do not limit the scope of the present disclosure. Also note that all features described in the embodiments are not necessarily needed to practice the disclosure. In the following description, the same units/elements will be denoted by the same reference numerals.

First Embodiment

FIG. 1 is a block diagram showing an example of a configuration of an imaging apparatus 100 according to a first embodiment.

The imaging apparatus 100 includes a lens unit 101, a lens control unit 102, an imaging unit 103, an image processing unit 104, a control unit 105, an operation unit 106, a display/reproduction unit 107, a body 111, a storage unit 108, an audio processing unit 200, and a sound collection unit 300.

The lens unit 101 includes a plurality of lenses, and performs operations such as an autofocus operation, a zoom operation, and the like based on a signal from the lens control unit 102. The lens unit 101 includes a drive unit for moving the lenses in operations such as the autofocus operation, the zoom operation, and the like. The drive unit includes a motor such as a stepping motor, an ultrasonic motor, or the like. The lens unit 101 may be configured to be detachable from the imaging apparatus 100. In the following description of the present embodiment, it is assumed that the lens unit 101 is connected to the imaging apparatus 100. The imaging unit 103 captures an optically formed image of a subject using an image sensor such as a CMOS sensor. The imaging unit 103 converts an image signal obtained as a result of capturing the image of the subject into a digital signal and outputs the resultant digital signal to the image processing unit 104. The image processing unit 104 performs various predetermined image processing such as an image quality adjustment on the image signal input from the imaging unit 103, and outputs the resultant processed image signal. The control unit 105 includes a hardware processor such as a CPU. The CPU of the control unit 105 controls each block of the imaging apparatus 100 by executing a program stored in the memory 110. The operation unit 106 accepts various instructions from a user. The operation unit 106 includes a touch panel, a dial, and the like, thereby receiving an instruction to start or end imaging, an instruction to perform an imaging setting, or the like from the user. The display/reproduction unit 107 displays a captured image or moving image and reproduces an audio signal accompanying the moving image. The storage unit 108 stores captured images and moving images. A bus 109 transfers data and control signals between units of the imaging apparatus 100. The memory 110 is a non-volatile memory that stores programs executed by the control unit 105.

Sound Collection Unit 300

First, the sound collection unit 300 will be described. The sound collection unit 300 includes an external-audio microphone (a main microphone) 301 and a noise reference microphone (a noise microphone) 302. The external-audio microphone 301 includes two microphones and is installed so as to acquire mainly a sound from the subject. The external-audio microphone 301 obtains sounds corresponding to audio signals of a right channel and a left channel of stereophonic audio signals.

The noise reference microphone 302 is installed so as to mainly obtain the drive noise that occurs inside the housing 110 of the imaging apparatus 100. For example, the noise reference microphone 302 does not have an opening communicating with the outside and is installed such that it is shielded by the housing 110 and thus external sounds are not input. The noise reference microphone 302 is installed near the external-audio microphone 301 such that the noise reference microphone 302 is capable of detecting noise which is almost equal to the noise input to the external-audio microphone 301. Alternatively, to capture the noise more accurately, the noise reference microphone 302 may be disposed near a noise source.

Audio signals from the external-audio microphone 301 and the noise reference microphone 302 in the sound collection unit 300 are each output as a one-channel audio signal.

Figure 2:
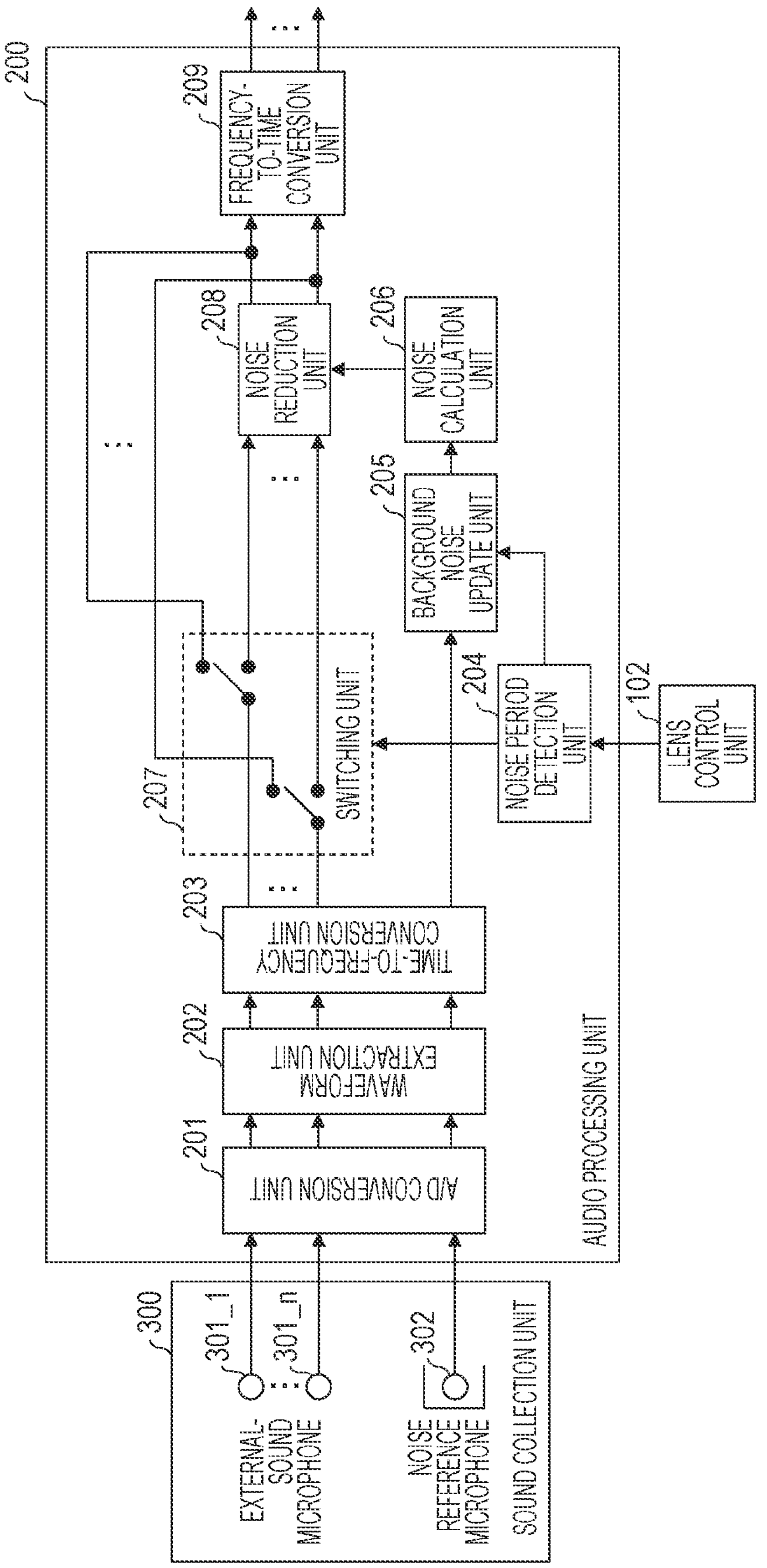
FIG. 2 is a block diagram of an audio processing unit and a sound collection unit according to one or more aspects of the present disclosure.

Next, the audio processing unit 200 and the sound collection unit 300 are described with reference to FIG. 2.

Audio Processing Unit 200

The audio processing unit 200 includes an A/D conversion unit 201, a waveform extraction unit 202, a time-to-frequency conversion unit 203, a noise period detection unit 204, a background noise update unit 205, a noise calculation unit 206, a switching unit 207, a noise reduction unit 208, and a frequency-to-time conversion unit 209.

Audio signals from the plurality of microphones of the sound collection unit 300 are each output as a one-channel audio signal. The A/D conversion unit 201 samples the analog signals output from the plurality of microphones of the sound collection unit 300 at the same timing and converts them into digital signals. Although the A/D conversion unit 201 is represented by a single block in FIG. 2, it actually includes as many A/D conversion units as there are microphones in the sound collection unit 300. The digital audio signals obtained as a result of the conversion by the A/D conversion unit 201 are output to the waveform extraction unit 202.

The waveform extraction unit 202 extracts the digital audio signal output from the A/D conversion unit 201 into pieces each having a predetermined length for each channel, performs a windowing process, and outputs a result to the time-to-frequency conversion unit 203.

The sequence of processes by the waveform extraction unit 202 is performed in a half overlapping manner which is generally used in audio processing. In the present embodiment, the waveform extraction unit 202 extracts the pieces of audio signals in units of 1024 samples while shifting the time every 512 samples, and performs windowing processing with a sine window or a Hann window, and outputs the resultant signal. Hereinafter, extracted each one unit including 1024 samples is treated as one frame. When imaging is being performed, signal processing is performed in extracted units described above.

The time-to-frequency conversion unit 203 performs processing such as a Fourier transform on the audio signal input from the waveform extraction unit 202 thereby converting the audio signal from the time-domain audio signal into a frequency-domain audio spectrum. The audio spectrum generated from the audio signal output from the external-audio microphone 301 is sent to either one of the noise reduction unit 208 or the frequency-to-time conversion unit 209 via the switching unit 207 depending on the result of the detection by the noise period detection unit 204. Hereinafter, the sound to be collected by the external-audio microphone 301 is referred to as an external sound or an environmental sound. The noise reference sound spectrum, which is the audio spectrum generated from the audio signal output from the noise reference microphone 302, is output to the background noise update unit 205 and the noise calculation unit 206.

The noise period detection unit 204 obtains, from the lens control unit 102, drive information used in driving the lens unit 101 which is the source of noise, and, based on the obtained drive information, detects a period during which noise occurs. The drive information includes, for example, the driving speed of the lens by the drive unit in the lens unit 101, the lens drive direction, the position of a drive member used for driving, and the like. Furthermore, the drive information includes control information (instruction information) that instructs the lens control unit 102 to start or end driving of the lens by the lens unit 101.

The drive information may be information for use by the lens control unit 102 in making a determination in driving the lens related to an out-of-focus state detection, an in-focus state detection, or the like. The drive information may be sent as a signal to the noise period detection unit 204. The noise period detection unit 204 may perform the noise detection based on the noise reference sound spectrum input from the time-to-frequency conversion unit 203. In this case, the noise period detection unit 204 may determine whether or not the input noise reference sound spectrum is noise on a frame-by-frame basis.

The noise period detection unit 204 may further detect a plurality of types of noise based on the drive information or the noise reference sound spectrum. The noise period detection unit 204 may be configured to detect, for example, long-term noise that occurs for a certain continuous period due to an operation of the drive unit that is a noise source, and short-term noise that occurs before and after the long-term noise.

The result of the detection of the noise period by the noise period detection unit 204 is output to the background noise update unit 205 and the switching unit 207. The background noise is, for example, noise (touch noise) caused by contacting between a body of a user and the main body of the imaging apparatus 100 or the lens unit 101, self-noise such as electric noise of the microphones 301 and 302, noise caused by intruding of an external sound, or the like. The background noise is noise other than the noise caused by driving the lens.

The background noise update unit 205 includes a storage unit that stores a background noise spectrum included in the noise reference sound spectrum, and updates the stored background noise spectrum as appropriate. It may be desirable that the background noise spectrum does not contain the lens drive noise component in the noise reference sound spectrum. In view of the above, in order to reduce the lens drive noise component included in the background noise spectrum, the background noise update unit 205 calculates a new background noise spectrum according to equation 1 shown below in a period outside the noise period detected by the noise period detection unit 204. The background noise update unit 205 does not generate or update the background noise spectrum during the noise period detected by the noise period detection unit 204.

$$S'_{nrbkg}(\omega, t) = \frac{S_{nrbkg}(\omega, t) * \alpha + |S_{nref}(\omega, t)|}{\alpha + 1} \tag{1}$$

In equation 1, $S_{nref}(\omega, t)$ is the noise reference sound spectrum, $S_{nrbkg}(\omega, t)$ is the background noise spectrum, ω is the frequency, t indicates time of the frame under process, and α is a predetermined coefficient. $S'_{nrbkg}(\omega, t)$ is the background noise spectrum obtained after being updated. As can be seen, the new background sound spectrum obtained after being updated is a weighted average value of the external environmental sound spectrum. The weighted averaging on the frame under process is performed only in a fixed period (a predetermined period). At t=0, that is, at the start of the noise reduction process, the initial value of the background noise spectrum is the noise reference sound spectrum $|S_{nref}(\omega, 0)|$ or a pre-stored background noise spectrum.

Figure 4:
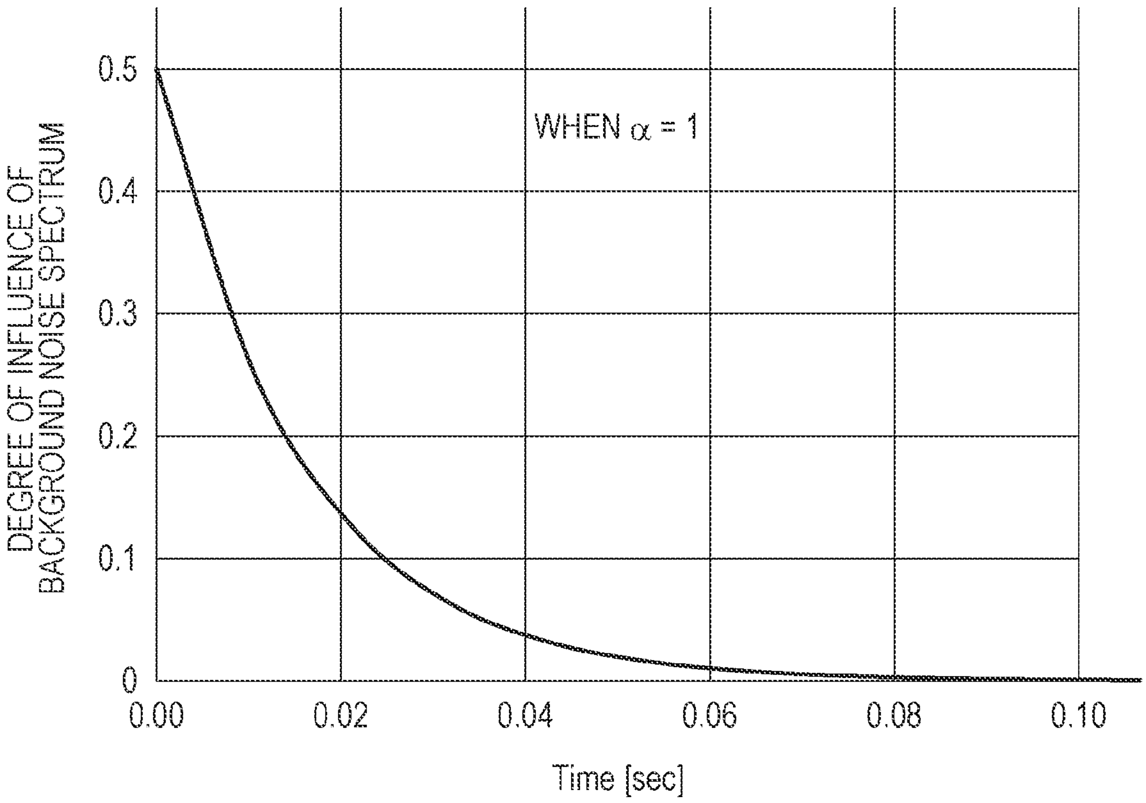
FIG. 4 is a diagram illustrating an example of a change in the degree of influence of a background noise spectrum in the first embodiment.

According to equation 1, the degree of the influence of the background noise spectrum of the previous frame in the current frame t under process on the next frame is 1/(α+1). For example, as shown in FIG. 4, when α=1, the influence of a frame is halved every other frame. That is, in a given frame, the immediately preceding frame has a strongest influence, and the older the frame, the weaker the influence. This makes it possible to reduce the influence within an appropriate period of time when noise, such as touch noise, other than the lens drive noise intrudes into the audio signal input from the noise reference microphone.

The noise calculation unit 206 calculates the noise component spectrum included in the audio signal input from the noise reference microphone 302 by subtracting the background noise spectrum from the noise reference sound spectrum. The noise component is an audio signal of noise included in the audio signal. The noise calculation unit 206 makes a correction such that the noise component of the audio signal input from the noise reference microphone is close to the noise component included in the audio signal input from the external-audio microphone 301. The noise calculation unit 206 has a correction coefficient table for the correction and multiplies a correction coefficient depending on the audio spectrum input from the noise reference microphone thereby obtaining the corrected noise spectrum. The noise calculation unit 206 outputs the corrected noise component spectrum to the noise reduction unit 208.

When the current period is in the noise period detected by the noise period detection unit 204, the switching unit 207 outputs the audio spectrum of each frame of the signal input from the external-audio microphone 301 to the noise reduction unit 208. When the audio spectrum of the frame is determined to be outside the noise period, it is output to the frequency-to-time conversion unit 209 (without passing through the noise reduction unit 208).

The noise reduction unit 208 reduces noise from the audio spectrum of the external-audio microphone 301 input from the time-to-frequency conversion unit 203, using the corrected noise component spectrum input from the noise calculation unit 206 thereby obtaining the audio spectrum with the reduced noise. Hereinafter, the audio spectrum of the external-audio microphone 301 will also be referred to as an external audio spectrum. The noise reduction unit 208 uses, for example, a Wiener filter to reduce the noise.

The frequency-to-time conversion unit 209 performs processing such as an inverse Fourier transform on the external audio spectrum input from the switching unit 207 or the noise-reduced audio spectrum input from the noise reduction unit 208 so as to convert it into a time-domain audio signal. In the present embodiment, the frequency-to-time conversion unit 209 outputs the audio signal while performing half-overlap addition.

The output audio signal is stored in the storage unit 108 together with the image signal from the image processing unit 104.

By the above-described operations of the respective units, it is possible to suppress temporary noise other than the noise caused by driving the lens from intruding into the audio signal from the noise reference microphone. Therefore, it is possible to accurately extract the noise caused by driving the lens, which results in an improvement in the noise reduction performance.

Figure 3:
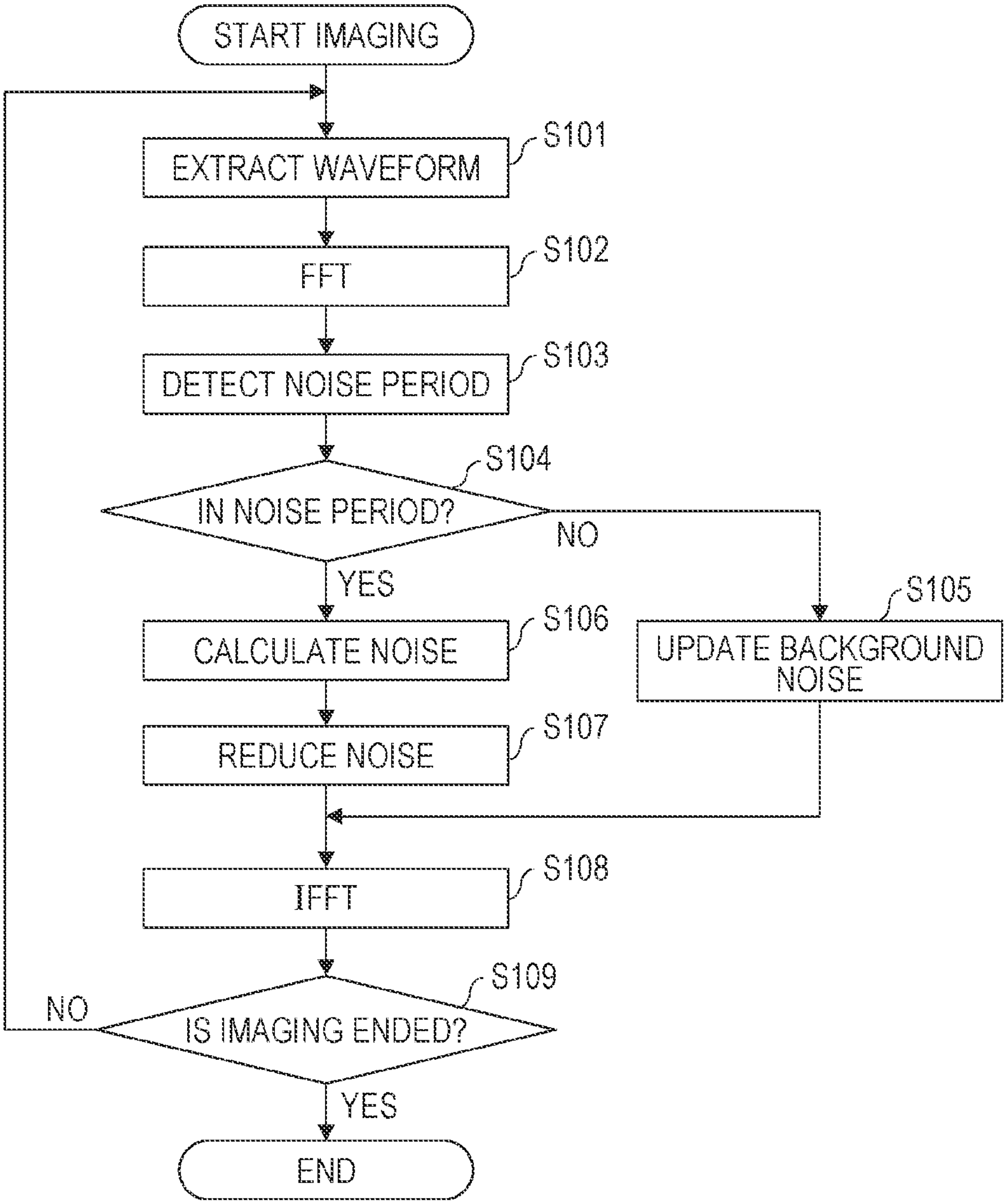
FIG. 3 is a flowchart of audio processing according to one or more aspects of the present disclosure.

FIG. 3 is a flowchart of audio processing according to the present embodiment. The processing of this flowchart is started in response to an instruction to start storing a moving image. The processing described below is realized by the control unit 105 by controlling various units such as the audio processing unit 200, the sound collection unit 300, and the like of the imaging apparatus 100. To control the various units to realize the processing of the flowchart, the control unit 105 executes software stored in the internal memory of the control unit 105.

In step S101, the waveform extraction unit 202 performs a waveform extraction process on the digital signal output from the A/D conversion unit 201. The extracted signal is output to the time-to-frequency conversion unit 203.

In step S102, fast Fourier transform (FFT) processing is performed on the digital signal input to the time-to-frequency conversion unit 203. A signal obtained as a result of performing the FFT processing on the signal of the external-audio microphone 301 is output to the switching unit 207, while a signal obtained as a result of performing the FFT processing on the signal of the noise reference microphone 302 is output to the background noise update unit 205 and the noise calculation unit 206.

In step S103, the noise period detection unit 204 performs the noise period detection process. The result of the noise period detection process is output to the background noise update unit 205 and the switching unit 207.

If the noise period detection unit 204 determines in step S104 that the current period is outside the noise period, then, in step S105, the background noise spectrum is updated for the frame under process in this period. The background noise update unit 205 calculates a new background noise spectrum according to equation 1, and updates the stored background noise spectrum using the calculated new background noise spectrum.

On the other hand, in a case where it is determined in step S104 that the current period is within the noise period, then in step S106, for the frame under process in this period, the noise calculation unit 206 calculates the noise component spectrum included in the audio signal input from the noise reference microphone 302. In step S106, the noise calculation unit 206 subtracts the background noise spectrum from the noise reference sound spectrum. The noise component spectrum generated in step S106 is output to the noise reduction unit 208.

In step S107, the noise reduction unit 208 performs processing to reduce the noise components included in the audio signal originating from the external-audio microphone 301. In this step S107, the noise reduction from the external audio spectrum calculated in step S102 is achieved using the noise component spectrum calculated in step S106. As a result of the processing in step S107, the noise-reduced audio spectrum is generated. In this step S107, the noise is reduced using, for example, a Wiener filter. Alternatively, in this step S107, the noise may be reduced, for example, by performing waveform subtraction in the frequency domain. The resultant noise-reduced audio spectrum is output to the frequency-to-time conversion unit 209.

In step S108, the frequency-to-time conversion unit 209 performs the inverse fast Fourier transform (IFFT) processing on the input audio spectrum. The converted audio signal is sequentially output to the storage unit 108 and is stored therein together with the image (the moving image).

The processes from steps S101 to S108 are performed repeatedly until it is determined in step S109 that the image capturing is completed. For example, when a user performs an operation to end the process of storing the moving image, it is determined that the image capturing is completed.

By controlling the processing in the above-described manner, it is possible to suppress temporary noise other than the noise caused by driving the lens from intruding into the audio signal of the noise reference microphone. Therefore, it is possible to accurately extract the noise caused by driving the lens, which results in an improvement in the noise reduction performance.

In the present embodiment, the storage medium of the storage unit 108 is, for example, a semiconductor memory such as an SD card, a CFExpress card, or the like.

The imaging apparatus 100 may further include a data compression unit to compress data of images and moving images to be stored.

In the present embodiment, the drive noise is assumed to be the noise caused by driving the lens, but noise generated by other drive units in the main body of the imaging apparatus may also be reduced in the same manner.

In the present embodiment, each of the units constituting the audio processing unit 200 excluding the A/D conversion unit 201 may be realized by executing a program by a CPU. Alternatively, each of the units constituting the audio processing unit 200 excluding the A/D conversion unit 201 may be realized by hardware such as a DSP, a dedicated LSI, or other types of electronic circuits.

Note that the noise calculation unit 206 may perform different noise estimation processes depending on the noise type detected by the noise period detection unit 204.

Although in the present embodiment, the noise reduction unit 208 is assumed to use, by way of example, the Wiener filter to reduce the noise, other methods may be used to reduce the noise. For example, the noise reduction unit 208 may use spectral subtraction, or may perform waveform subtraction in the time domain. The noise reduction unit 208 may further perform a process to reduce the level of the signal such that when the level of the signal in a frequency bin is equal to or lower than a predetermined threshold value, the level of the signal is further reduced. The noise reduction unit 208 may perform different noise reduction processes depending on the noise type detected by the noise period detection unit 204.

In the present embodiment, it is assumed that two external-audio microphones 301 (a stereo microphone), but the present embodiment may also be applied to different types microphones such as a monaural type, a surround type, or an ambisonics type, or may be applied to different number of channels.

In the present embodiment, it is assumed for simplicity that the audio processing unit 200 performs only noise reduction processing, but the audio processing unit 200 may further perform other processing. For example, the audio processing unit 200 may further perform spectrum correction processing such as equalizing to make the sound easier to hear, or processing to emphasize the stereophonic effects on the reproduced sound. Furthermore, the audio processing unit 200 may further perform encoding using various audio codecs such as MP3, AAC, or the like.

Although in the present embodiment, it is assumed only one noise reference microphone 302 is provided, a larger number of noise reference microphones may be provided. Some of the noise reference microphones 302 may be disposed on the lens side. Some or all of the noise reference microphones 302 may be vibration sensors that detect vibrations of an object instead of detecting vibrations in the air.

The noise reference microphone 302 is assumed to be installed near the external-audio microphone 301 or near a noise source, there is no particular restriction on the installation location as long as it is possible to detect noise and estimate a noise component input to the external-audio microphone 301.

Second Embodiment

Figure 5:
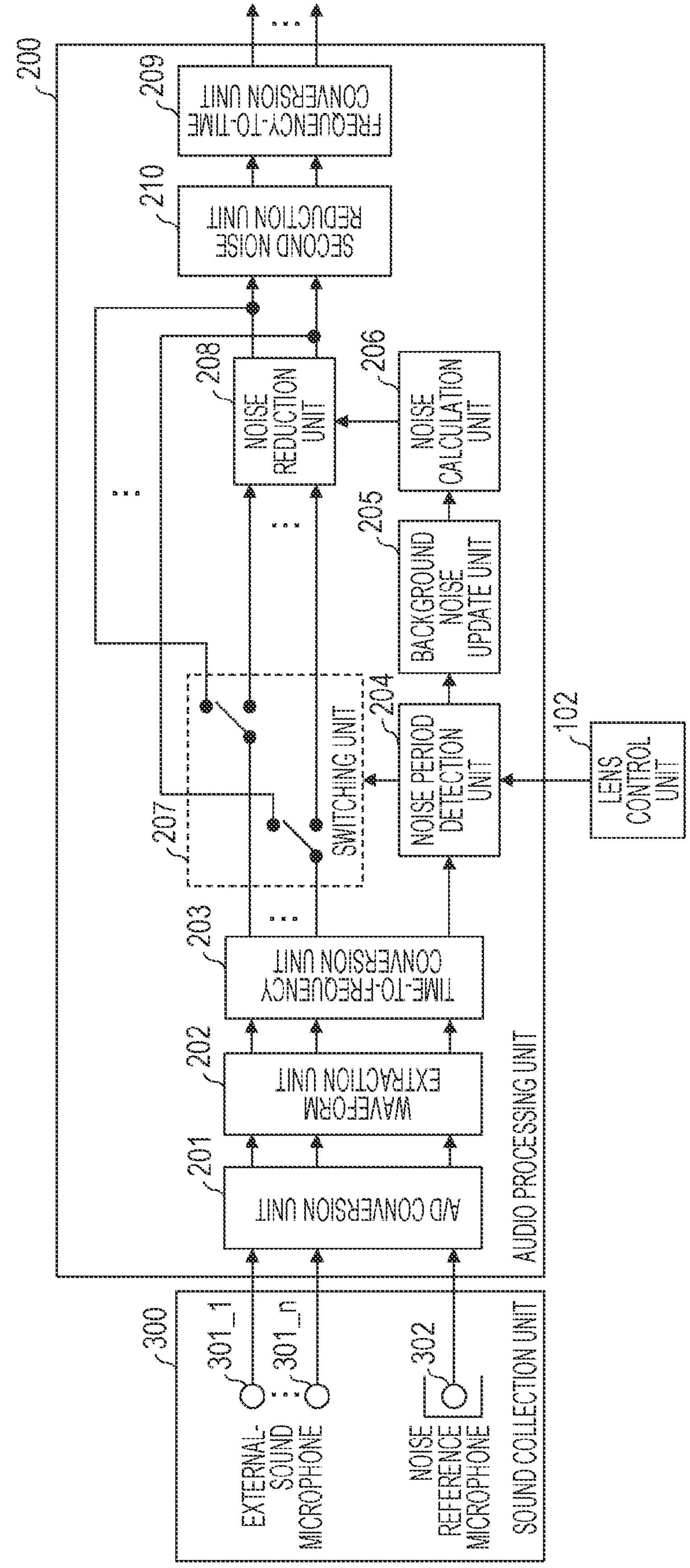
FIG. 5 is a block diagram of an audio processing unit and a sound collection unit according to one or more aspects of the present disclosure.
Figure 6:
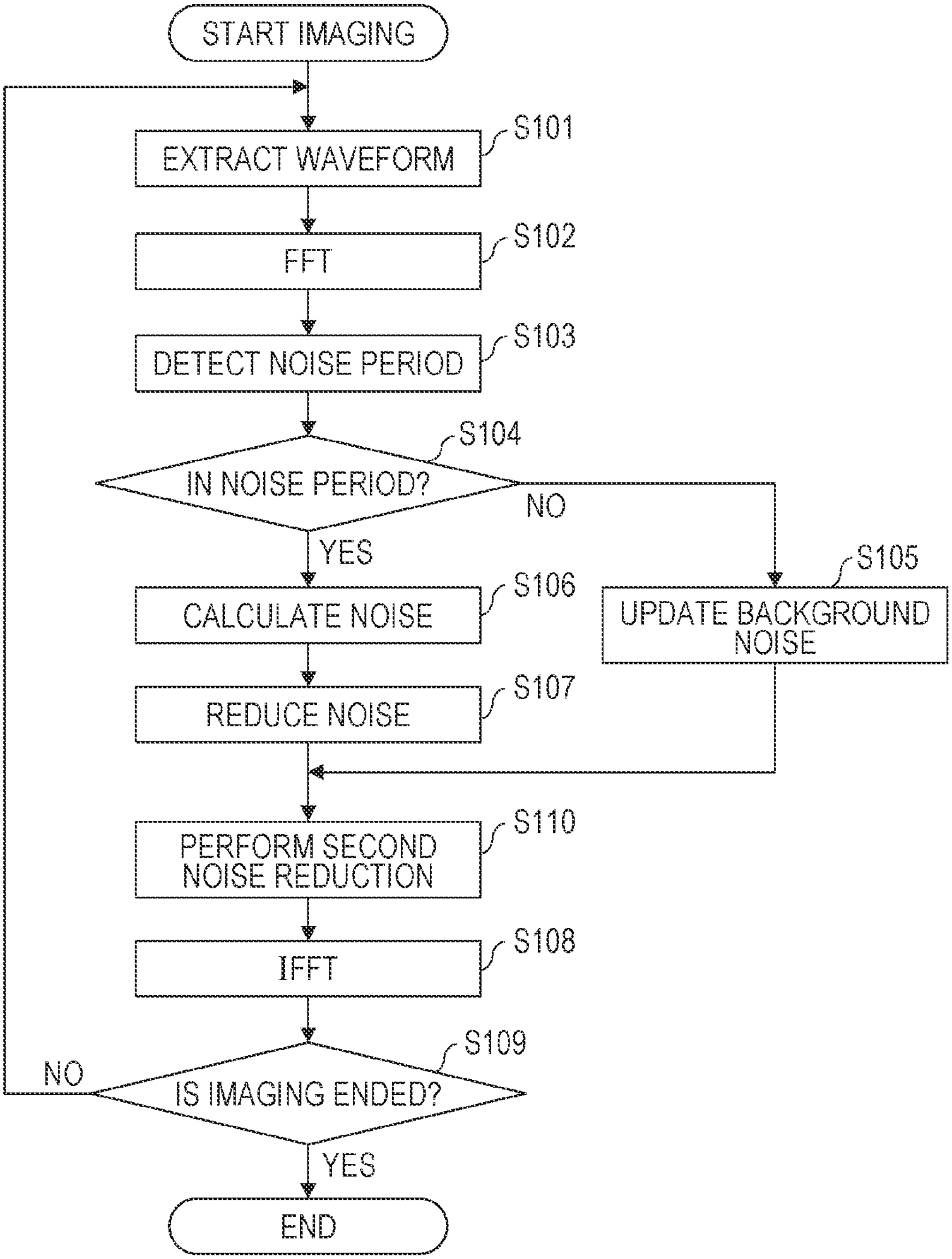
FIG. 6 is a flowchart of audio processing according to one or more aspects of the present disclosure.

Referring to FIGS. 5 and 6, a second embodiment of the present disclosure is described below.

In the second embodiment, the noise period detection unit 204 determines whether a frame of interest is in a noise period not only based on the drive information but also based on a ratio of the noise reference sound spectrum of the frame to the stored background noise spectrum.

In the first embodiment described above, in a case where it is determined by the noise period detection unit 204 that a frame of interest is outside the noise period, the audio spectrum of this frame is output by the switching unit 207 to the frequency-to-time conversion unit 209 without passing through the noise reduction unit 208. In the second embodiment, as shown in FIGS. 5 and 6, a second noise reduction unit 210 is provided before the frequency-to-time conversion unit 209. In this configuration, the audio signal is subjected to noise reduction processing (second noise reduction processing) in step S110 regardless of whether the audio signal passes through the noise reduction unit 208.

The second noise reduction processing is different from the processing by the noise reduction unit 208. For example, the second noise reduction process may be a process of subtracting previously stored background noise of the external-audio microphone 301 from the audio spectrum of the signal input from the external-audio microphone 301 or the audio spectrum which has been subjected to the noise reduction process performed by the noise reduction unit 208.

In a case where the external-audio microphone 301 and the noise reference microphone 302 have similar frequency characteristics, the second noise reduction process may be, for example, a process of subtracting the stored background noise spectrum from the audio spectrum. Here, the audio spectrum is the audio spectrum generated from the audio signal input from the external-audio microphone 301 or the audio spectrum obtained as a result of the noise reduction processing performed by the noise reduction unit 208.

The second noise reduction unit 210 uses a Wiener filter to achieve the noise reduction. For example, the second noise reduction unit 210 may use spectral subtraction, or may perform waveform subtraction in the time domain to achieve the noise reduction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-191538 filed Nov. 25, 2021, which is hereby incorporated by reference herein in its entirety.

What is claimed is:

1. An imaging apparatus comprising:

a first microphone that obtains an audio signal of a sound that occurs outside the imaging apparatus;

a second microphone that obtains an audio signal of a sound including drive noise that is noise from a drive unit; and a processor that executes instructions stored in a memory and functions as each of following units:

a detection unit that detects a noise period during which the drive noise occurs;

an obtaining unit that obtains background noise based on an audio signal obtained by the second microphone during a period other than the noise period detected by the detection unit;

a generation unit that generates an audio signal of the drive noise based on an audio signal obtained by the second microphone during the noise period detected by the detection unit and the background noise obtained by the obtaining unit; and a noise reduction unit that reduces, using the audio signal of the drive noise generated by the generation unit, the drive noise from the audio signal obtained by the first microphone during the noise period detected by the detection unit.

2. The imaging apparatus according to claim 1, wherein the drive unit is a lens.

3. The imaging apparatus according to claim 2, wherein the detection unit detects the noise period based on a control signal for driving the lens.

4. The imaging apparatus according to claim 1, wherein in a case where the background noise is newly obtained, the obtaining unit updates the already obtained background noise based on the already obtained background noise and the newly obtained background noise.

5. The imaging apparatus according to claim 1, wherein the obtaining unit calculates an average value of the already obtained background noise and the newly obtained background noise, and updates the already obtained background noise based on the average value.

6. The imaging apparatus according to claim 1, wherein the processor further functions as a second noise reduction unit that performs noise reduction processing, different from the noise reduction processing performed by the noise reduction unit, on the audio signal from the noise reduction unit.

7. The imaging apparatus according to claim 1, wherein the processor further functions as a conversion unit that converts the audio signal obtained by the first microphone and the audio signal obtained by the second microphone from time-domain audio signals to frequency-domain audio signals, wherein the generation unit generates an audio signal of the drive noise in the frequency domain, and the noise reduction unit reduces the drive noise from the audio signal in the frequency domain obtained by the first microphone, by using the audio signal of the drive noise in the frequency domain generated by the generation unit.

8. A method for controlling an imaging apparatus, the method comprising:

obtaining, by a first microphone, an audio signal of a sound that occurs outside the imaging apparatus;

obtaining, by a second microphone, an audio signal of a sound including drive noise that is noise from a drive unit;

detecting a noise period during which the drive noise occurs;

obtaining background noise based on an audio signal obtained by the second microphone during a period other than the detected noise period;

generating an audio signal of the drive noise based on an audio signal obtained by the second microphone during the detected noise period and the obtained background noise; and reducing, using the generated audio signal of the drive noise, the drive noise from the audio signal obtained by the first microphone during the detected noise period.

* * * * *